Sept. 8, 1970  R. L. WHITE  3,527,438
MANUALLY OPERABLE VEHICLE SEAT ADJUSTER
Filed July 8, 1968  3 Sheets-Sheet 3

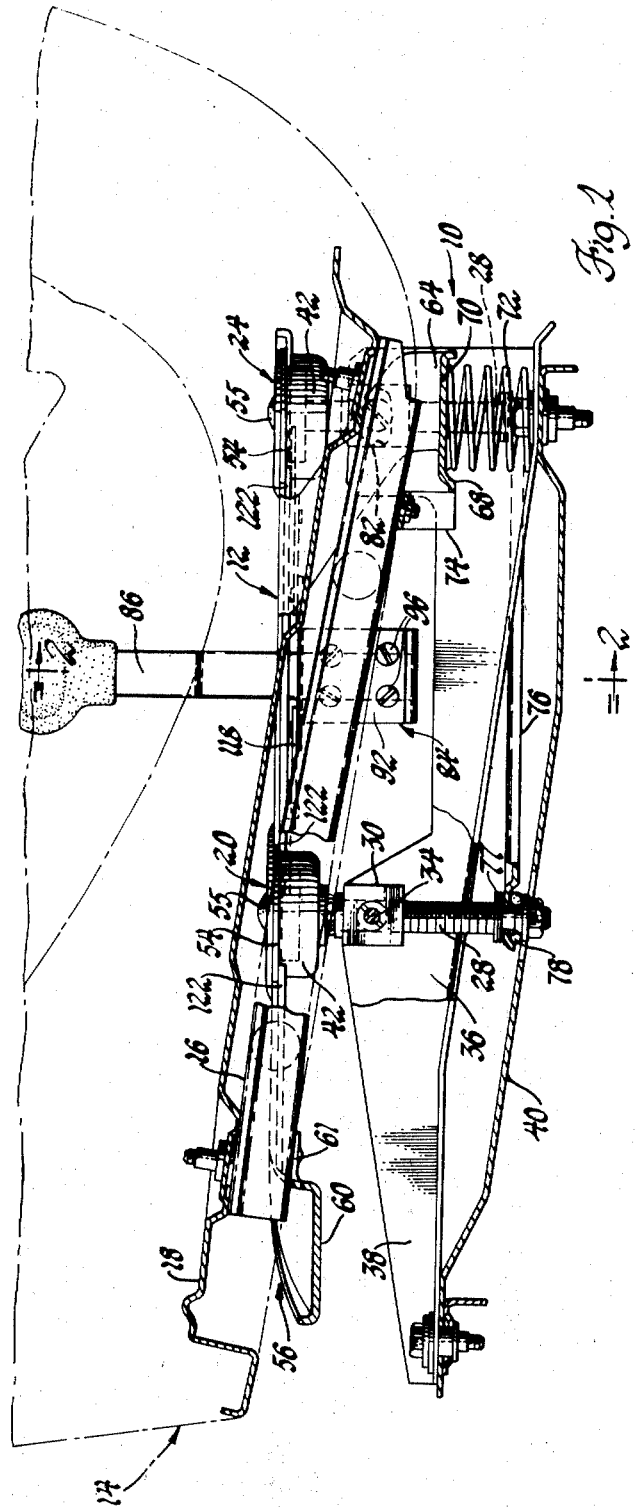

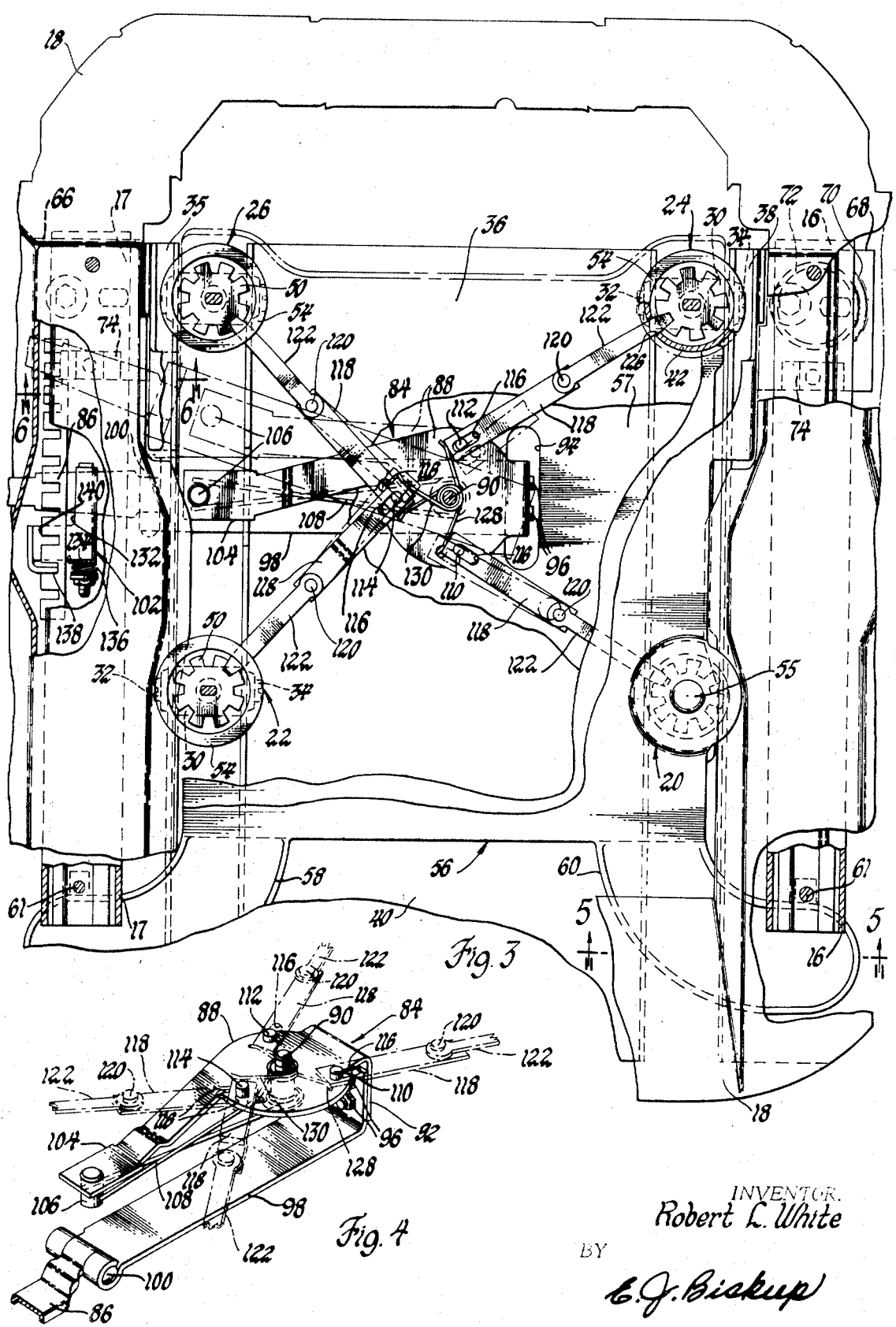

INVENTOR.
Robert L. White
BY
E. J. Biskup
ATTORNEY

United States Patent Office 3,527,438
Patented Sept. 8, 1970

3,527,438
MANUALLY OPERABLE VEHICLE SEAT ADJUSTER
Robert L. White, Frankenmuth, Mich., assignor to General Motors Corporation, Detroit, Mich., a corporation of Delaware
Filed July 8, 1968, Ser. No. 743,141
Int. Cl. B60n 1/02
U.S. Cl. 248—396          3 Claims

ABSTRACT OF THE DISCLOSURE

A manually operable seat adjuster having screw means located adjacent to the forward end and rearward end of the seat for providing independent vertical adjustment of the seat to a plurality of positions. Each screw means has the screw portion thereof formed with a wheel for rotation therewith when the associated seat end is being adjusted in position. Locking means in the form of a spring biased lock bar are provided for holding the wheel from rotation and thereby maintaining the seat in an adjusted position. A manually operable actuator is connected to the lock bar for releasing the latter and freeing the wheel so that the shifting weight of the occupant will cause rotation of the associated screw portion to permit vertical adjustment of the seat.

---

Two forms of power-operated seat adjusters presently utilized on production vehicles for providing height adjustment of the seat are referred to as four-way and six-way adjusters. Each adjuster is actuated by a reversible motor which drives a transmission assembly incorporating solenoids and drive cables leading to the adjuster mechanisms. In the four-way adjuster one solenoid controls horizontal movement of the seat, while a second solenoid controls vertical movement of the seat. In the six-way adjuster one solenoid controls vertical movement of the seat front, a second solenoid controls horizontal movement, and a third solenoid controls vertical movement of the rear of the seat. As would be expected, a control switch is required with each of the adjusters to actuate the motor and one of the solenoids simultaneously.

One power-operated adjuster of the above-described type which has been favorably received for providing vertical seat movement can be seen in U.S. Pat. 3,182,947 which issued on May 11, 1965, in the name of Akira Tanaka and is assigned to the assignee of the present invention. Referring to that patent, it will be noted that front and rear vertically oriented screw actuators are connected to a linkage consisting of a seat support member and a link pivotally secured to a base at one end and one of the screw actuators at the other end. The use of the screw actuators accounts for a simplified adjuster mechanism which can be economically manufactured and assembled. However, as should be apparent, when the adjuster is combined with the power-operating equipment mentioned above, the cost of the entire unit becomes relatively high. Hence, there have been efforts on the part of those skilled in the art to design a seat adjuster in which power equipment is not required for achieving the desired movement of the seat. Until this invention, most efforts in this direction have resulted in extremely complicated mechanisms which although providing the desired movement of the seat, have not substantially decreased the cost required to manufacture and assemble the adjuster. Accordingly, the present invention is directed towards a manually operable seat adjuster which maintains the desirable screw devices utilized in power-operated seat adjusters and substitutes for the costly power equipment a relatively simple and inexpensive latching mechanism which serves to lock and unlock the screw devices to permit the latter to provide vertical seat movement when the occupant merely shifts his weight forwardly or rearwardly.

The pricipal objects of the present invention are to provide a manually operable seat adjuster having screw devices connected between the vehicle floor and the seat adjacent to the forward end of the seat and the rear end of the seat and provided with manually operable locking means which selectively release the screw devices to permit vertical adjustment of either end of the seat; to provide a seat adjuster having vertically oriented screw devices at the forward and rear ends of the seat that will provide adjustment of the seat when the occupant shifts his weight forwardly or rearwardly after manually unlatching the screw devices; to provide a seat adjuster mechanism having screw devices which control vertical movement of the seat and can be placed in a locked position through a manually operable latching mechanism; to provide a latching mechanism for preventing rotation of a screw device associated with a seat adjuster movable by the shifting weight of the seat occupant; to provide a six-way manually operable seat adjuster having a single actuator handle which serves to unlock a first adjuster mechanism and permit vertical adjustment of the seat when the operating handle is moved in a horizontal plane in either direction and unlock a second adjuster mechanism to provide fore and aft movement of the seat when the lever is moved in a vertical plane.

Other objects and advantages of the present invention will be more apparent from the following detailed description when taken with the drawings in which:

FIG. 1 is an elevational view with parts broken away of the manually operable seat adjuster made in accordance with the invention;

FIG. 2 is a view taken on line 2—2 of FIG. 1;

FIG. 3 is a plan view taken on line 3—3 of FIG. 2 and has parts broken away so as to show in detail the various operating elements of the adjuster;

FIG. 4 is a perspective view showing in detail the actuating device utilized with the seat adjuster of FIGS. 1, 2 and 3;

Figure 7:
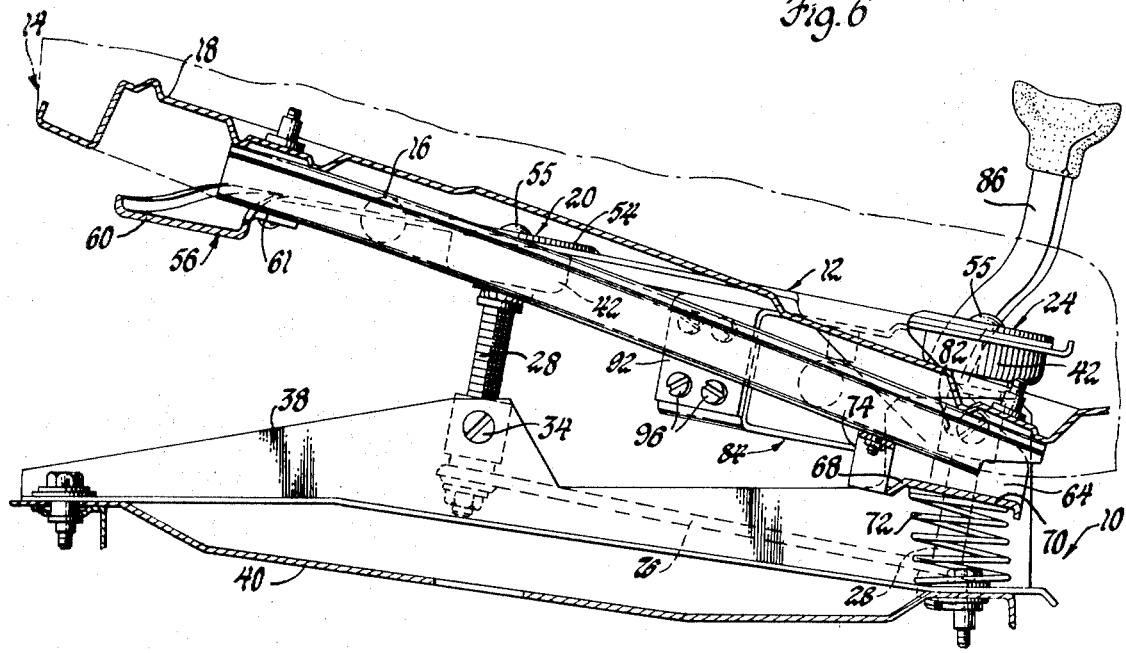
Figure 8:
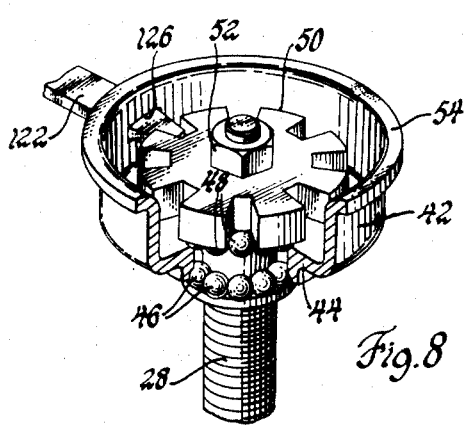

FIG. 7 is a view similar to FIG. 1 showing the relative position of the various parts of the seat adjuster when the latter is adjusted so that the front end of the seat is in the fully raised position; and FIG. 8 is an enlarged perspective view showing the construction of the locking arrangement associated with each of the screw devices incorporated with the seat adjuster shown in the above figures.

Referring to the drawings and more particularly FIGS. 1, 2 and 3 thereof, a seat adjuster 10 made in accordance with the invention is shown comprising a first adjuster mechanism 12 which serves to selectively position either the front edge or rear edge of a seat 14 (shown in phantom lines) between a fully lowered position as seen in FIG. 1 and a raised position. A second adjuster mechanism, which includes a pair of laterally spaced longitudinally extending track structures 16 and 17 of conventional design, has fastened thereto the lower plate portion 18 of the seat 14 for supporting the latter and providing fore and aft movement thereof.

More specifically, the first adjuster mechanism 12 comprises four vertically orientated screw devices 20, 22, 24 and 26 which, as seen in FIG. 3, are spaced so as to have each device located adjacent to one of the corners of the seat 14. Thus, each screw device can be said to be positioned at the corner of a rectangle, the sides of which are parallel to the sides of the seat 14. Moreover, each screw device is identically formed and, as seen in FIGS. 2, 5, 6 and 7, consists of a screw portion 28 threadably received within a nut portion 30 which in turn is pivotally supported along a transverse horizontal axis by spaced trunnions 32, 34 connected between brackets 35, 36 and 38 bolted to a floor pan 40 of the vehicle as seen in FIG. 1.

As seen in FIG. 8, the upper end of each screw portion 28 is rotatably supported within a cup member 42 having a radially inwardly extending flange 44 which engages a plurality of ball bearings 46 and 48 located in vertically spaced horizontal rows. The ball bearings roll in suitable races formed with the screw portion 28 and the flange 44 and permit rotation of the screw portion relative to the cup member 42 but restrict any relative movement along the longitudinal axis of the screw portion. A star wheel 50 is rigidly fixed to the screw portion 28 by a nut 52 and is located within the cup member 42 which also has a radially outwardly extending flange 54 formed therewith. As seen in FIGS. 1 and 2, the flange 54 of each screw device supports a cap 55 that covers the cup member 42 and is secured to an upper base member 56. The cup member 42 is also fixed with a lower base member 57, so that the latter together with the upper base member 56 serve to rigidly retain each of the screw devices in the aforementioned positions.

Figure 5:
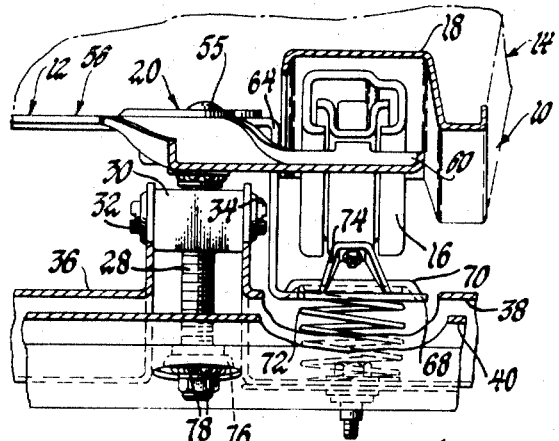
FIG. 5 is a view taken on line 5—5 of FIG. 3.
Figure 6:
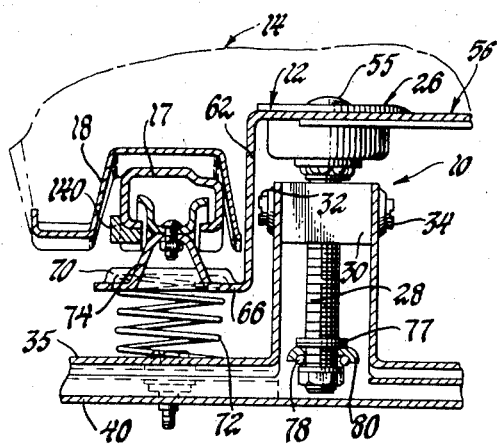
FIG. 6 is a view taken on line 6—6 of FIG. 3.

FIG. 3 clearly shows that the upper base member 56 is generally square in plan view with the forward portion thereof being formed with a pair of identical outwardly curved arms 58 and 60 which are rigidly connected at a point 61 with the forward ends of the track structures 17 and 16, respectively. Similarly, FIGS. 1, 2 and 3 show that the rear portion of the upper base member 56 has a pair of downwardly depending and rearwardly extending arms 62 and 64, respectively formed with integral side plates 66 and 68, each of which has a cup portion 70 which houses the upper end of a coil spring 72, the lower end of which rests on the associated bracket. Each side plate 66, 68 is also formed with an upwardly extending inverted V-shaped member 74 which rigidly supports the rear end of the track structure as seen in FIGS. 5 and 6.

As seen in FIG. 1, the screw devices 20 and 24 are interconnected by a stabilizer link 76 carried by the lower end of each of the screw portions 28 and located between a washer 77 and a plurality of ball bearings 78 so as to permit rotation of the screw portions within supporting apertures in the stabilizer link. Screw devices 22 and 26 are similarly connected by a stabilizer link 80. Thus, as will become more apparent as the description of the invention proceeds, during adjustment of the seat, the stabilizer links 76 and 80 serves to maintain alignment of the paired screw devices and assure proper operation thereof.

The screw portion 28 of each of the screw devices 20, 22, 24 and 26 is intended to rotate whenever an upward or downward force is applied to the front portion or rear portion of the seat 14. In order to realize this result, the helix angle of the threads formed on each screw portion has been selected to be approximately 45° thereby permitting the seat occupant to merely lean back to apply an upward force at the front of the seat and cause the screw portions 28 of the screw devices 20 and 22 to rotate within the accommodating nut portion 30 and result in a raising of the forward edge of the seat 14 to the position shown in FIG. 7. Similarly, and as seen in FIG. 1, if the seat occupant leans forwardly so as to apply a downward force ahead of the screw device 20, the rear end of the seat adjuster with the aid of the springs 72 will move the seat 14 upwardly due to the screw portions 28 in the screw devices 24 and 26 rotating within the accommodating nut portions.

At this juncture, it will be noted that when the front of the seat 14 is adjusted upwardly as described above, the seat rear, in effect, pivots about the transversely aligned trunnions 32, 34 supporting the nut portions incorporated with screw devices 24 and 26. In order to compensate for the arcuate path which necessarily must be followed by the seat as it pivots upwardly, the latter-mentioned nut portions are supported in slots 82 which permit the trunnions to shift longitudinally a slight amount. Likewise, when the rear of the seat 14 moves upwardly, it pivots about the trunnions 32, 34 associated with the screw devices 20 and 22 and the slots 82 supporting the nut portions of screw devices 24 and 26 provide the same function.

In order to hold the seat 14 in an adjusted position when either the front edge or the rear edge thereof is raised or lowered as described above, a latching mechanism 84 is provided which is operated by an actuator handle 86 located along one side of the seat 14 as seen in FIG. 2. The latching mechanism 84 is best seen in FIGS. 3 and 4, and comprises a disc type plate member 88 pivotally connected to the upper base member 56 by a pivotal connection 90. A portion 92 of the plate member 88 extends downwardly through a slot 94 provided in the lower base member 57 for rigid connection through a plurality of bolts 96 to an arm 98 which leads to the actuator handle 86. Between the arm 98 and the actuator handle 86 is a hinge connection 100 which permits the actuator handle 86 to be raised for releasing a locking device 102 associated with the track structure 17 of the second adjuster mechanism. The locking device 102 and the manner of releasing the same will be more specifically described hereinafter. The other end of the plate member 88 is also formed with an arm 104 having a pin 106 rigidly connected therewith. A spring 108 is coiled about the pivotal connection 90 and has the opposite ends thereof crossing each other and located on opposite sides of the pin 106. The spring 108 serves to maintain and return the plate member 88 and the associated actuator handle 86 to the full line position as seen in FIG. 3.

The plate member 88 has three pins 110, 112, and 114 rigidly connected thereto which are located on a circle having the pivotal connection 90 as its center. The pins 110, 112 and 114 are equally angularly spaced approximately 120° apart and each is located in a lost motion slot 116 formed in a link 118 which is pivotally connected at a pivot point 120 to a lock bar 122, the head end of which extends through an opening 126 provided in the cup member 42 of one of the screw devices for engagement with the star wheel 50. As seen in FIG. 3, pins 110 and 112 are connected with lock bars 122 located in screw devices 20 and 24, respectively, while pin 114 supports and controls movement of the lock bars 122 located in screw devices 22 and 26. Spring members 128 and 130 are coiled about the pivotal connection 90 and each has a pair of arms which engage and bias outwardly one pair of the links 118.

In operation, when the seat adjuster 10 has the various components thereof located in the positions seen in FIG. 1, the seat 14 is in the fully lowered position. Therefore, should it be desired by the seat occupant to raise the front end of the seat 14, this can be accomplished by moving the actuator handle 86 towards the rear of the seat 14 as seen in FIG. 3 causing the plate member 88 to pivot about its pivotal connection 90 to the phantom line position as limited by the slot 94. Thus, the plate member 88 will rotate in a clockwise direction a predetermined amount and cause pins 110 and 114 to exert a pulling force on the associated links 118 leading to the screw devices 20 and 22 and serve to remove the lock bars 122 from a position where they hold the associated star wheels 50 from rotation. During this time, pins 112 and 114 move within the lost motion slots 116 provided in the links 118 leading to the screw devices 24 and 26 so the latter remain in a locked state. Thereafter, the seat occupants shifts his weight toward the rear of the seat by leaning rearwardly on the seat back permitting the screw portions 28 of each of the screw devices 20 and 22 to freely rotate within the associated nut portions 30 to cause the front edge fo the seat 14 to be elevated to the fully raised position of FIG. 7 or an intermediate position. When the desired position is reached, the seat occupant releases the actuator handle 86 permitting the spring 108 to return it to the neutral position at which time the pins 110 and 114 return to their original positions and the springs 128 and 130 shift the retracted links forwardly to cause the lock bars 122 to again engage the star wheels 50 of the screw devices 20 and 22 to lock the latter from rotation. If it is then desired to raise the rear of the seat 14, the seat occupant merely shifts the actuator handle 86 forwardly so as to cause the plate member 88 to rotate in a counterclockwise direction as viewed in FIG. 3 until it abuts the other end of the slot 94. At this time, the pins 110 and 114 move within the slots 116 of the associated links 118 leading to the screw devices 20 and 22 while pin 112 and pin 114 cause the lock bars 122 of the screw devices 24 and 26 to be retracted so as to free the screw portion 28 thereof and permit adjustment as has been previously described. Once again when the desired elevation of the rear of the seat 14 has been attained, the actuator handle 86 is released permitting the spring 108 to return the latching mechanism 84 to the full line position of FIG. 3. Lowering of the seat, of course, is realized by unlocking the front or rear screw devices as has been described and having the seat occupant apply his weight in the direction of the unlocked screw devices.

As has been mentioned, the actuator handle 86 is also supported so it can be raised about the hinge connection 100 to release the locking device 102 so that fore and aft positioning of the seat 14 can be realized along the track structures 16 and 17. In this connection and as seen in FIG. 2, the locking device 102 consists of a lever 132 which is pivotally connected to a bracket 134 depending from the lower channel member of the track structure 17. A spring 136 normally urges the lever 132 in a clockwise direction so as to place a tongue 138 between one pair of a plurality of teeth 140 formed with the upper channel member of the track structure 17 as seen in FIG. 3. Thus, when the actuator handle 86 is released, the spring 136 acting through the lever 132 returns the actuator handle to its normal full line position shown in FIG. 2.

Accordingly, as explained above, the first and second seat adjuster mechanisms are combined in such a manner that six-way seat adjustment is permitted. In other words, both the forward and rear ends of the seat 14 can be changed in elevation as well as the entire seat as a unit can be shifted forwardly or rearwardly when desired by using the common actuator handle 86 to provide both modes of seat adjustment.

Various changes and modifications can be made in this construction without departing from the spirit of the invention. Such changes and modifications are contemplated by the inventor and he does not wish to be limited except by the scope of the appended claims.

I claim:
1. A seat adjuster mechanism for supporting a vehicle seat on a vehicle floor comprising, manually operable adjustment means located at the front and rear ends of the seat for supporting said seat in a plurality of positions, said adjustment means including non-rotatable nut portions secured to the vehicle floor and threadedly receiving screw portions, means rotatably securing said screw portions to said seat and limiting said screw portions to rotational movement with respect to said seat, a plate member pivotably secured to said seat for rotation about an axis generally parallel to the axes of rotation of said screw portions, a link member for each screw portion, means including a pin and slot lost motion connection connecting each link member to said plate member, a locking bar operatively connected to each link member for bodily shifting movement therewith as a unit, a plurality of locking surfaces on each screw portion, each locking bar being lockingly engageable with one of the locking surfaces of a respective screw portion to lock said respective screw portion against rotation, means biasing each locking bar into locking engagement with said one locking surface, and manual operable means for rotating said plate member in opposite directions, rotation of said plate member in one direction bodily shifting certain of the units to move the locking bars thereof out of locking engagement with the locking surfaces of respective screw portions and allow adjustment of the front end of the seat, rotation of said plate in the other direction bodily shifting the remainder of the units to move the locking bars thereof out of locking engagement with the locking surfaces of respective screw portions and allow adjustment of the rear end of the seat.

2. A seat adjuster mechanism for supporting a vehicle seat on a vehicle floor comprising, manually operable adjustment means located at the front and rear ends of the seat for supporting said seat in a plurality of positions, said adjustment means including non-rotatable nut portions secured to the vehicle floor and threadedly receiving screw portions, means rotatably securing said screw portions to said seat and limiting said screw portions to rotational movement with respect to said seat, a link member for each screw portion, each link member having a slot portion, a plate member pivotably secured to said seat for rotation about an axis generally parallel to the axes of rotation of said screw portions, said plate member having a plurality of angularly spaced pins secured thereto and received within said slots to provide a lost motion connection connecting each link member to said plate member, a locking bar operatively connected to each link member for bodily shifting movement therewith as a unit, a plurality of locking surfaces on each screw portion, each locking bar being lockingly engageable with one of the locking surfaces of a respective screw portion to lock said respective screw portion against rotation, means biasing each locking bar into locking engagement with said one locking surface, and manual operable means for rotating said plate member in opposite directions, rotation of said plate member in one direction bodily shifting certain of the units to move the locking bars thereof out of locking engagement with the surfaces of respective screw portions and allow adjustment of the front end of the seat, rotation of said plate in the other direction bodily shifting the remainder of the units to move the locking bars thereof out of locking engagement with the locking surfaces of respective screw portions and allow adjustment of the rear end of the seat.

3. A seat adjuster mechanism as recited in claim 2 wherein one pin is received within more than one slot portion to connect more than one link member to said plate member.

References Cited

UNITED STATES PATENTS

| | | | |
|---|---|---|---|
| 382,473 | 5/1888 | Justi | 248—397 |
| 2,298,351 | 10/1942 | De Rose | 248—394 |
| 2,930,428 | 3/1960 | De Rose | 248—394 |
| 3,182,947 | 5/1965 | Tanaka | 248—396 |

EDWARD C. ALLEN, Primary Examiner

PO-1050
(5/69)

UNITED STATES PATENT OFFICE
CERTIFICATE OF CORRECTION

Patent No. __3,527,438__      Dated __September 8, 1970__

Inventor(s) __Robert L. White__

It is certified that error appears in the above-identified patent and that said Letters Patent are hereby corrected as shown below:

Column 2, line 3, "pricipal" should read -- principal --.

Column 4, line 72, "fo" should read -- of --.

Column 6, line 48, before "surfaces" insert -- locking --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents